United States Patent
Scheifele (10) Patent No.: US 6,174,393 B1
(45) Date of Patent: Jan. 16, 2001

(54) PROCESS FOR THE PRODUCTION OF A MULTI-CHAMBER PACKAGING TUBE (75) Inventor: Fredy Scheifele, Hinwil (CH)

(73) Assignee: KMK Lizence Ltd., Port Louis (MU)

( * ) Notice: Under 35 U.S.C. 154(b), the term of this patent shall be extended for 0 days.

(21) Appl. No.: 09/048,668

(22) Filed: Mar. 26, 1998

(30) Foreign Application Priority Data

Mar. 26, 1997 (DE) .............................. 197 12 736

(51) Int. Cl.[7] ........................... B29C 43/18; B29C 45/14; B29C 53/36; B65D 35/22
(52) U.S. Cl. ...................... 156/69; 156/242; 156/244.13; 156/244.27; 156/272.4; 156/292; 156/294; 264/259; 264/DIG. 41; 222/94
(58) Field of Search ........................ 156/69, 242, 244.13, 156/244.22, 244.27, 245, 272.4, 292, 294; 264/250, 259, DIG. 41; 215/6; 222/94; 493/920, 931, 210, 211, 213

(56) References Cited

U.S. PATENT DOCUMENTS

| | | | |
|---|---|---|---|
| Re. 36,035 | * 1/1999 | Usen et al. ............................. 222/94 |
| 2,673,374 | * 3/1954 | Strahm ................................... 156/69 |
| 2,777,164 | * 1/1957 | Strahm ......................... 264/DIG. 41 |
| 3,290,422 | * 12/1966 | Michel .................................. 264/259 |
| 3,788,520 | * 1/1974 | Dukess ................................... 222/94 |
| 4,352,775 | * 10/1982 | Magerle ............................... 264/259 |
| 5,219,373 | * 6/1993 | Hatakeyama et al. ............... 264/250 |
| 5,782,384 | * 7/1998 | Mustafia et al. ....................... 222/94 |
| 5,788,794 | * 8/1998 | Valyi .................................... 156/293 |
| 5,858,153 | * 1/1999 | Mack .................................... 156/292 |
| 5,869,565 | * 1/1999 | Winston et al. ....................... 222/94 |
| 5,900,086 | * 5/1999 | Keller ..................................... 156/69 |

FOREIGN PATENT DOCUMENTS

571175 * 2/1959 (CA) .................................. 264/259

* cited by examiner

Primary Examiner—Steven D. Maki
(74) Attorney, Agent, or Firm—Bachman & LaPointe, P.C.

(57) ABSTRACT

A process to produce multi-chamber packaging which comprises a tube pipe, a tube head connected to the tube pipe and a partition housed in the tube pipe comprises changing a mandrel with a partition, applying the tube pipe to the mandrel changed with the partition and bonding a tube head to the partition and the partition to the tube pipe.

12 Claims, 6 Drawing Sheets

PROCESS FOR THE PRODUCTION OF A MULTI-CHAMBER PACKAGING TUBE

BACKGROUND OF THE INVENTION

A process is known in which a pre-finished tube pipe is connected with an also pre-finished tube head. Subsequently, a partition structured in folded form, which is resilient in its lengthwise and crosswise direction, is pushed into the tube pipe. Optionally, the partition, i.e. one of its crosswise sides, is connected with the tube head by gluing, while the other crosswise side is combined with the closure seam of the tube. Because of the inherent spring forces, which act in the crosswise and lengthwise direction, the partition presses against the inside of the tube pipe with its lengthwise sides, and, unless gluing on the inside of the tube head is provided, against the closure seam and the tube head.

In this process, the partition is installed in the interior of a pre-finished tube, a method of procedure which is difficult to automate.

Another process is characterized in that a pre-finished head is provided with a partition—this is done by mechanical means which connect the partition with the head—whereupon the partition, with the head, is introduced into a tube pipe to such an extent that the head can be connected with the tube pipe in known manner—bonding of tube head and tube pipe along the external circumference of the head.

In this process, as compared with the first process mentioned, introduction of the partition into the tube element is simplified, but this occurs at the expense of the prior unification of partition and head, which represents an addition process step, relative to the number of process steps of the first process mentioned, which again is difficult to automate.

The disadvantage of the known processes is that using these processes, pre-finished tube components are brought together, in other words they are fundamentally assembly processes, which are kept within narrow limits of process economics, for example yield of tubes per time unit, by complex automated process steps, particularly if the assembly processes additionally comprise connection processes involving gluing or melting.

SUMMARY OF THE INVENTION

It is an object of the present invention to provide a process for the production of multi-chamber tubes, with which the disadvantages of the known processes are avoided, and this task is accomplished by means of a process for the production of a multi-chamber packaging tube made of plastic, the tube consisting of a tube pipe, a tube head, and at least one partition housed in the tube pipe, in which the tube head is formed by means of a die, comprising a matrix and a mandrel as die halves, by molding a portion of plastic material, and, at the same time, attached to the tube pipe, characterized by the following process steps:

(a) charging the mandrel with the partition;
(b) applying the tube pipe to the mandrel which has been charged with the partition;
(c) melting the edges of a second partial piece of the partition together with the inside surface of the tube head;
(d) bonding the lengthwise edges of a first partial piece of the partition to the inside surface of the tube pipe.

To accomplish the task, the invention proceeds from a so-called head forming/attachment process. A head forming/attachment process for the production of packaging tubes, consisting of a tube pipe and a tube head, is a process is in which a pre-finished tube pipe is connected with a tube head, while the latter is formed, i.e. molded. The head forming/attachment process is divided into two variants, which are determined according to the technique by which the head is formed from a plastic. A differentiation is made between an injection molding process and an extrusion die process. Both processes work with a mold consisting of two mold halves, referred to as the matrix and the mandrel in the specific case of tube production, which are charged with plastics to form a head. In the case of injection molding, a closed mold (mandrel moved into the matrix) is charged with a liquid plastic, while in the extrusion die process, an open matrix is filled with a portion of plasticized plastic and then the mandrel is moved in. As it moves in, the mandrel molds the material portion into a head. Since the mandrels carry the tube pipe on their circumference in both process variants, the latter are molded onto the heads as they are formed. Both process variants-have been developed to a high technical level and are characterized by a yield of a high number of tube pieces per time unit. To accomplish the task according to the invention, the invention turns away from known assembly processes, on the one hand, and towards head forming/attachment processes, which are equally known, on the other hand, but develops the latter further in that it prescribes that the mandrel, fitted with the tube pipe and the partition, be used to form a multi-part tube as a mold half of an injection-molding or extrusion die mold. In the available charging techniques, an extension of the charging time of the mandrel with a pipe can be kept within limits as compared with the charging time with a pipe and a partition, so that the high production efficiency of the head forming/attachment process is essentially not impaired. The process according to the invention offers the advantage that an end of the partition which runs into the head connects with the latter on its own as the head is formed, which in itself already represents a significant simplification of the production of a multi-chamber tube.

BRIEF DESCRIPTION OF THE DRAWINGS

Using a drawing which represents a device, an exemplary embodiment of the object of the invention will be explained in greater detail. The drawing shows.

DETAILED DESCRIPTION

Figure 1:
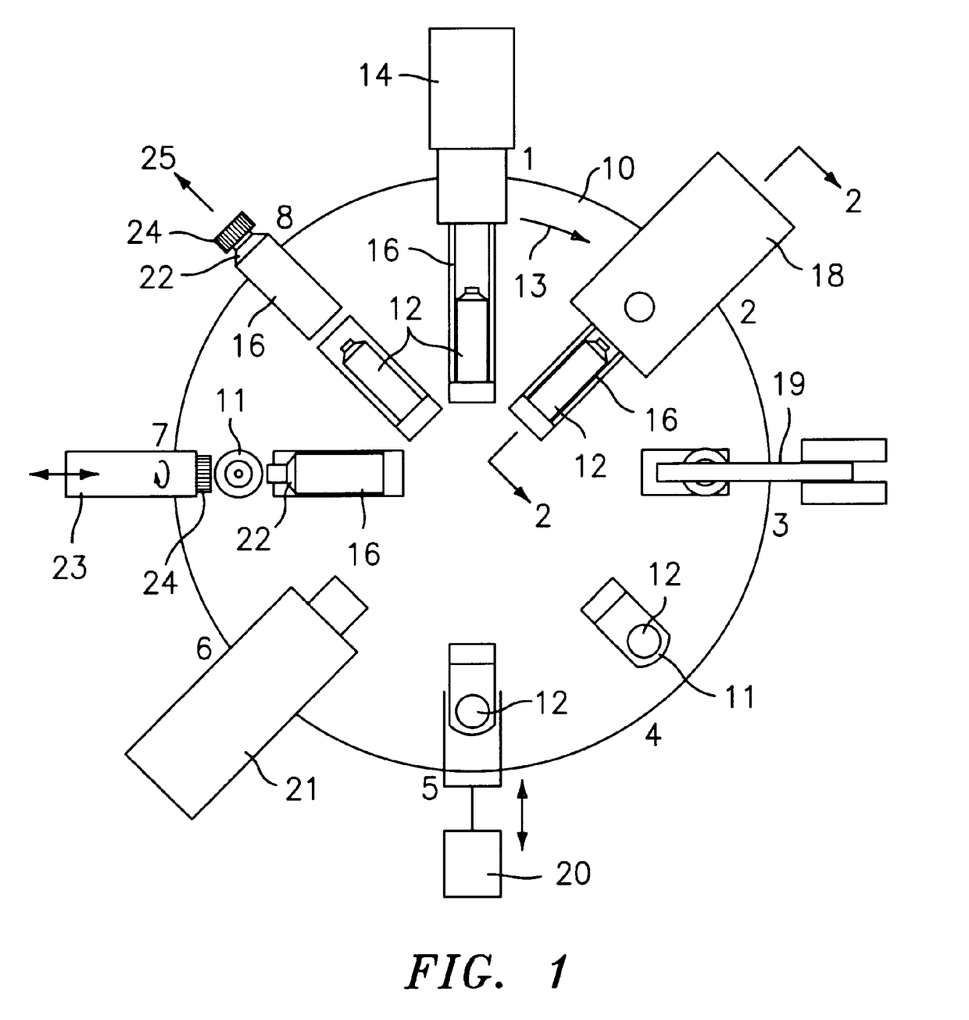
FIG. 1: an extrusion die machine in a top view, with dies arranged on an indexing table, each passing through eight step positions.

FIG. 1 shows the indexing element, structured as an indexing table 10, in a top view. On the indexing table 10, matrices 11 and mandrels 12 are arranged at uniform intervals in the circumference direction, with a mandrel 12 being assigned to each matrix 11. The matrices 11 are open toward the top and the mandrels 12 are arranged to pivot from a horizontal position by an angle of 90°, into a vertical position on the indexing table 10, in which they are coaxial with the matrices 11 in each instance. In the coaxial position, the mandrels 12 can be shifted axially, in order to be able to close and re-open the related matrix 11. Eight step positions are indicated in FIG. 1, as examples, using the numbers 1 to 8, the indexing table 10 being driven by means which are not shown, by one step position in each instance, in the direction of the arrow 13.

In the following, the eight step positions, each with a station assigned to it, will be described in detail.

Station 1

By means of a charging device 14, the mandrel 12 is first charged with a partition 15 and then with a pre-finished tube pipe 16. In this connection, the partition 15 is held in place in a slit 17 of the mandrel 12, with its flanges 45 resting against the mandrel, so that the tube pipe 16 can be pushed over the mandrel 12 and the flanges 45, passing over the latter in close proximity. Close proximity means a distance between the flange 45 and the inside surface of the mandrel of 0.03 mm to 1.0 mm, preferably 0.4 to 0.8 mm. During charging, the mandrel 12 is in a horizontal position, so that charging takes place in the horizontal direction.

Station 2

Station 2 has a fixed material dispenser 18 assigned to it. By means of this material dispenser 14, a portion (not shown) of plasticized plastic is introduced into the matrix 11, which is open toward the top, and covered by the material dispenser 18, in free fall. Another type of charging can consist of applying the material portion onto a material carrier which passes through the matrix in its lengthwise direction, which brings the material portion into its intended position in the matrix. The position of the matrix 11 is illustrated in position 7. During indexing from position 2 to position 3, the mandrel 12 is pivoted into the vertical position in which it is coaxial with the matrix.

Station 3

By means of a toggle lever or another locking means 19 assigned to this station 3, the mandrel 12 is moved into the matrix 11, in its position coaxial to the matrix 11, in order to press the material portion introduced into the matrix 11 into a tube head, where this tube head is melted onto the tube pipe 16 and the partition 15 is melted onto the inside of the tube head, and, in the region in which the tube pipe 16 is melted onto the tube head, also onto the inside of the tube pipe 16. By means which are not shown, the mandrel 12 is held in this pressing position, in order to remain there when the toggle lever 19 is retracted again.

Station 4

The mandrel 12 remains in the pressing position, so that the 123 pressed tube head with the tube pipe 16 melted onto it and the partition 15 can cool and solidify. For this purpose, the matrix 11 and the mandrel 12 are cooled by a coolant, via connections which are not shown.

Station 5

The mandrel 12 continues to remain in the pressing position for cooling. Preferably, an inductive bonding device 20 can be integrated into this station 5, which connects, i.e. bonds the flanges 45 to the inside surface of the tube pipe, close to their lengthwise edges of the partition 15. Melting takes place in that the material, i.e. the plastic, is melted close to the lengthwise edges and in a strip-shaped zone which lies opposite them, running in the lengthwise direction of the tube pipe 16, and brought into engagement, i.e. pressed together, preferably under pressure. The bonding device 20 is not arranged on the indexing table 10, but rather peripherally, like the charging device 14, separate from the latter. To perform a bonding process, the bonding device 20 moves forward horizontally, in the direction of the arrow, and subsequently passes over the mandrel 12 with the tube pipe 16 and the partition 15, in a vertical direction.

Station 6

By means of a retraction device 21, the mandrel 12 is moved out of the matrix 11 in the axial direction, and thereby the pressing die (matrix 11 and mandrel 12), which consists of the matrix 11 and the mandrel 12, is opened again, after the means, not shown, which form a thread on the tube head, have released the molded thread by means, not shown, for example by moving molding jaws apart. During indexing from position 6 to position 7, the mandrel 12 with the head molded onto the tube pipe 16 and the partition 16 connected with the former is pivoted back into the horizontal position.

Station 7

By means of a screw-on device 23 assigned to this station, a closure 24, i.e. a cap 24 is screwed onto the tube head 22, or pushed on in the case of push-on caps.

Station 8

The tube, consisting of the tube pipe 16, the partition 15, the tube head 22, and the cap 26, has now been finished and is ejected in the direction of the arrow 25, or pulled off the mandrel 12 by a device, not shown. After the next cycle step, the mandrel 12 is again charged with a tube pipe 16 and a partition 15.

In accordance with the device shown in FIG. 1 and described above, the process performed on this device comprises eight process steps in connection with the device, called cycle steps one to eight, with process step 7 (application of a cap 24 to tube head 22) not being compulsory for implementation of the process according to the invention. Although eight stations are indicated in the present exemplary embodiment, in which the said eight process steps are implemented, it is also possible to distribute the eight process steps among a different number of stations, for example ten stations. For example, between station eight and one, another station with a charging device could be provided, which charges the mandrel 12 only with the partition 15, prior to charging it with the tube pipe 16. Furthermore, another station could be provided between stations 3 and 4, or 4 and 5, or 5 and 6, at which lengthwise bonding of the partition by means of the bonding device could take place. In other words, all of the combined process steps described in connection with FIG. 1 (station 1, charging of the mandrel 12 with the partition 15 and then with the tube pipe 16; station 5, cooling of the formed/attached head 22 with simultaneous bonding of lengthwise edges) can be separated and adapted analogous to the number of stations. However, fewer than eight stations can also be provided, if functions for the production of a multi-chamber tube are brought together.

Figure 2:
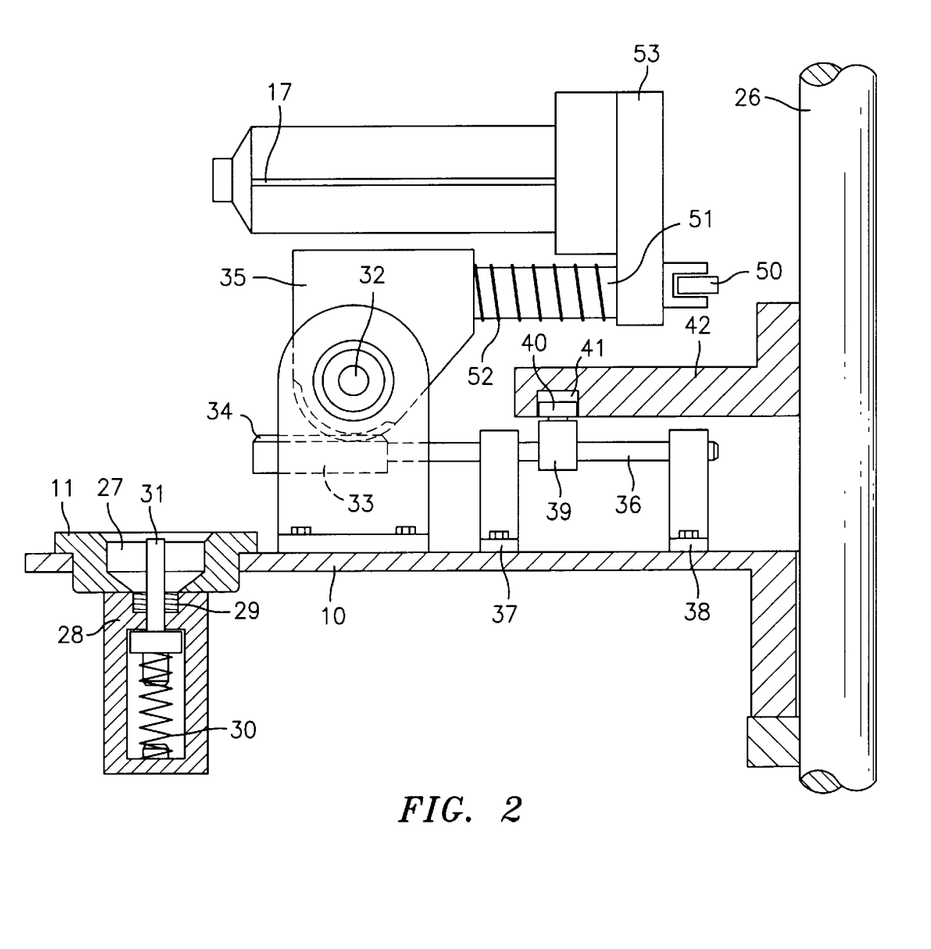
FIG. 2: the indexing table with one of the dies partly in cross-section, in step position 1, before the mandrel of the die is charged with a tube pipe and a partition.

FIG. 2 shows the indexing table 10, with one of the dies partly in cross-section, in step position 1, i.e. at station 1, before the mandrel 12, which runs horizontally, has been charged with the partition 15 and subsequently with the tube pipe 16. 26 refers to a fixed shaft, around which the indexing table 10 is mounted to rotate, and via which it is driven in steps, by means which are not shown. The matrix 11, which has a mold cavity 27, is countersunk into and attached to the indexing table 10. The mold cavity corresponds to the outer delimitation of the tube head 22 (FIG. 1). Below the matrix 11 and coaxial to it, there is another matrix part 28, in which another mold cavity 29 for formation of the thread on the tube head 22 is arranged. In the other matrix part 28, a hole punch 31 which us tensed in the axial direction by a spring 30 is mounted to move axially. The hole punch 31 is tensed in the direction of the mold cavity 27 by the spring 30, and when the mandrel 12 is introduced into the matrix 11, it is pushed back counter to the force of the spring 30. The hole punch 31 serves to keep the tube opening clear while the tube head 22 is being molded. The matrix part 28 can be rotated about a further axis, in order to be able to release the thread of the finished tube head. For this purpose, it is turned by means, not shown, or opened by other means, not shown, instead of being turned.

The mandrel 12 is mounted to pivot around an axis 32. A pivoting device, for example comprising a rack 33, which engages in the gearing of a pivoting part 35 with its teeth, serves for this pivoting purpose. The rack 33 is connected with a ram 36 which mounted to shift axially, in two bearing blocks 37, 38 which are attached to the indexing table 10. Between the bearing blocks 37, 38, the ram 36 is rigidly connected with a tenon 39, which has a guide roll 40 which is guided in a guide groove 41 of a cam 42, which is fixed in place like the shaft 26. The guide groove 41 has a progression in the cam 42 such that the tenon 39 is moved back and forth between the bearing blocks 37, 38, causing the mandrel 11 to be pivoted into the vertical or the horizontal position, via the means described.

The mandrel 12 shown in FIG. 2 is structured in such a way at its front, free end 43, that the free end 43 can form the inside contour of a tube head 22. In this connection, the continuation 43a forms the flow-through opening of the outlet of the tube head 22, while the subsequent bevel 43b forms the inside surface of the shoulder of the tube head 22.

To hold a partition 15, a slit 44 passes through the mandrel 12 in the axial direction, specifically proceeding from the front, free face of the continuation 43a, in an expanse which corresponds to the length of a partition 15. The partition 15 is pushed into this slit 44 by the charging device 14.

Figure 3:
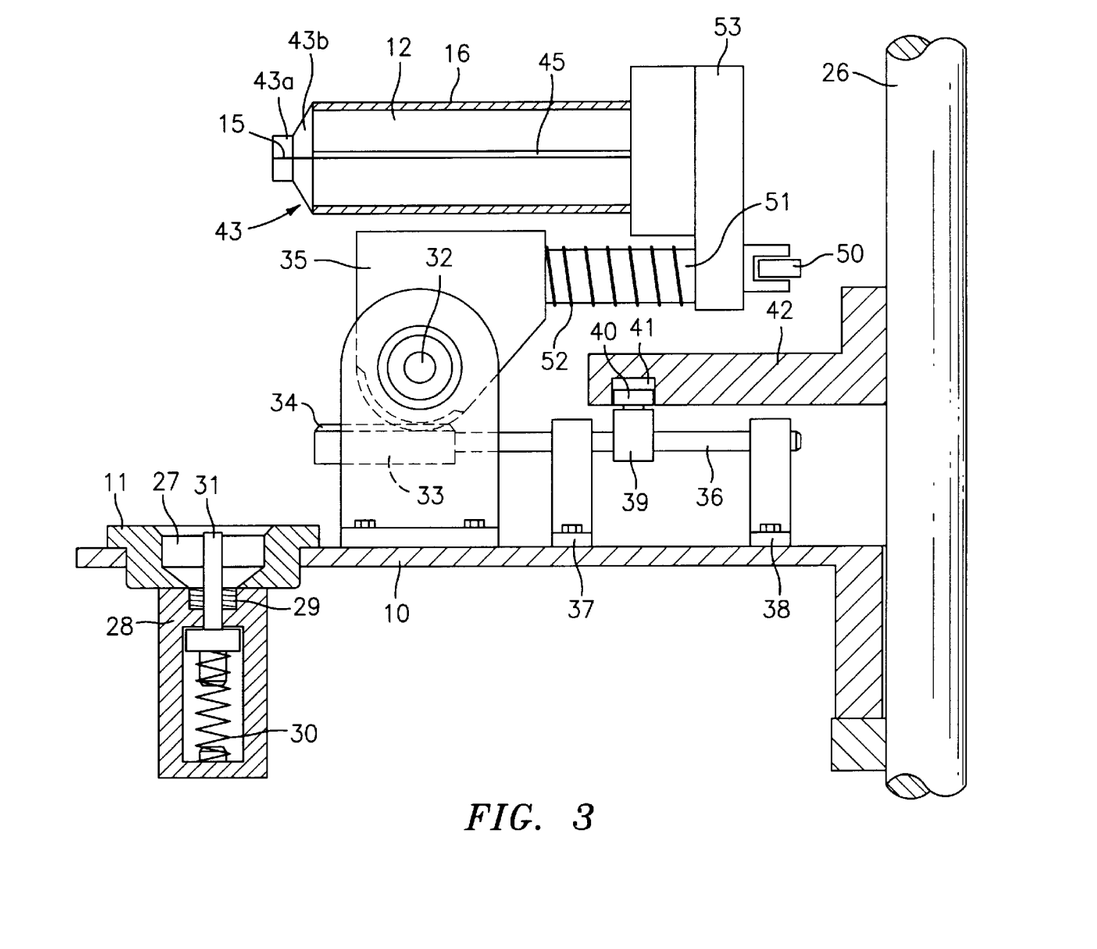
FIG. 3: the indexing table with one of the dies partly in cross-section, in step position 1, after the mandrel of the die is charged with a tube pipe and a partition.

FIG. 3 shows the indexing table 10 with one of the dies partly in cross-section, in step position 1, i.e. in station 1, but in contrast to FIG. 2, after the mandrel 12, which continues to be in the horizontal position, has been charged with a partition 15 and a tube pipe 16. The blank (FIG. 6) of a partition 15 is prepared in such a way that it corresponds to the front, free end 43 of the mandrel 12 in its outside shape at one end, and directly after that part corresponds in its width to at least half the circumference of the mandrel, and in its length corresponds to the length of a tube, preferably proceeding from the front, free end of the continuation 43a, where the excess of the partition 15 on both sides rests against the mandrel. This causes the partition 15 to be completely held within the mandrel 12, and, with reference to the excess, with the same contour as the surface of the mandrel 12. Dimensioning the head part of the partition 15 with the same contours and the same dimensions, and holding it in the mandrel 12, is sufficient to melt the outer edges of the front end of the partition 15 (head part) together with the inside surface of the outlet opening and the inside surface of the shoulder of the head 22, as the head 22 is formed. Likewise, dimensioning the lengthwise sides of the partition 15 which follow the front, free end of the partition 15, is sufficient to combine them with the inside surface of the pipe 22, specifically to combine them in such a way that the partition 15 corresponds to the width of the tube if the tube is pressed flat. The flanges 45 are therefore bonded on in such a way that each flange 45 forms a reserve or equalization surface for the partition 15, in order to satisfy the additional need for partition surface when the tube is pressed flat.

Figure 6:
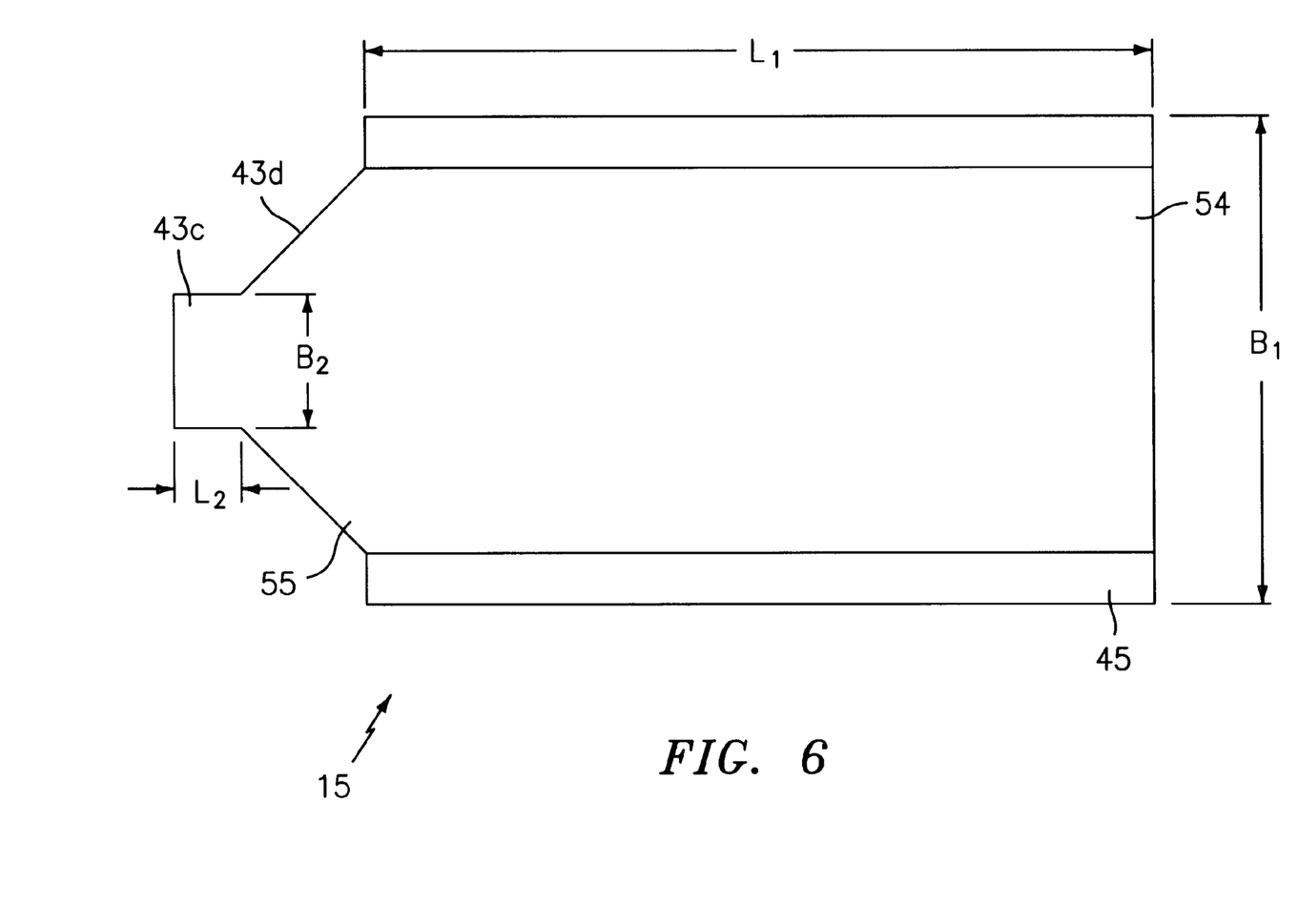
FIG. 6: a partition in a top view.

In FIG. 6, the excess width areas of the partition are referred to as flanges 45, which permit strip-like bonding in the lengthwise seam. These flanges are bent away on both sides of the partition 15 (in accordance with the mandrel diameter), rest against the inside surface of the tube pipe 22, and each have a width formed from half the difference between half the circumference of the tube and the mandrel diameter, preferably increased by 5% to 25%, preferably 8% to 12% of the width. In FIG. 3, parts which are the same as those in FIG. 2 are indicated with the same reference numbers.

Figure 4:
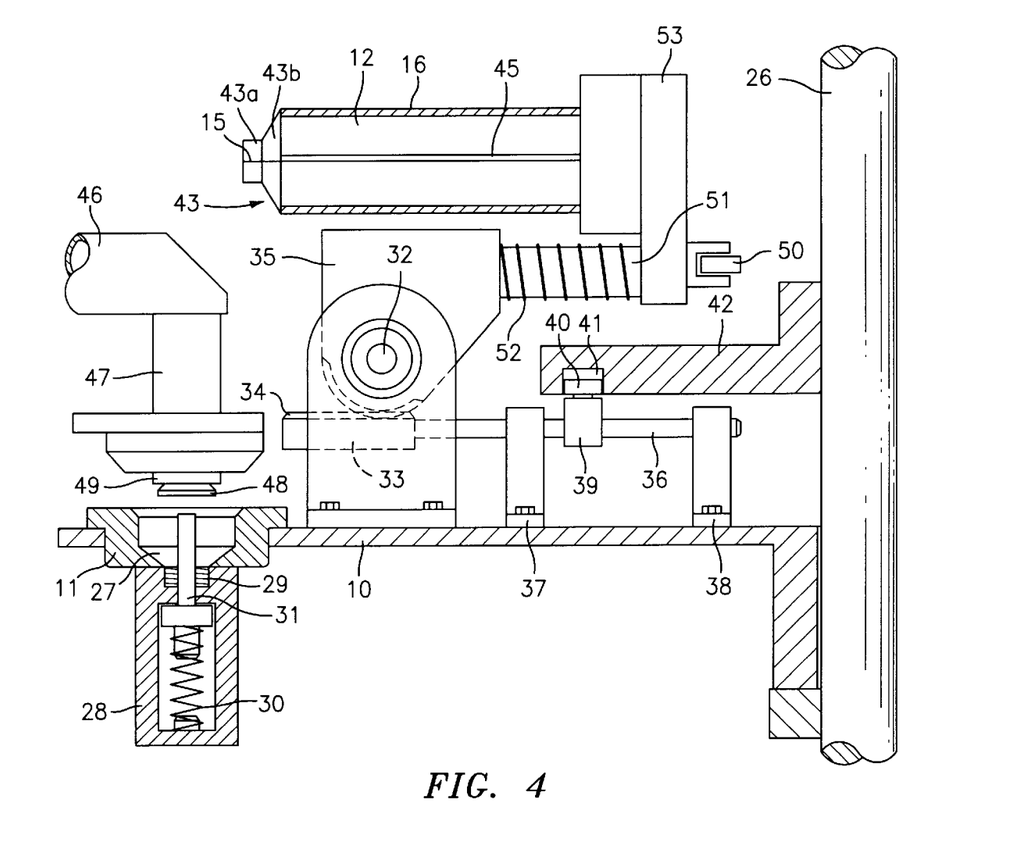
FIG. 4: the indexing table with one of the dies partly in cross-section, in step position 2, with the mandrel charged, and the matrix open toward the top, below a filling device (extruder)

FIG. 4 shows the indexing table 10 with one of the partly in cross-section, in step position 2, i.e. at station 2, with the mandrel 12 charged and lying in the horizontal position, and the matrix 11 open toward the top, below an extruder 46 as a filling device. The extruder 46 is assigned to station 2 and fixed in place there. It has a pipe part 47 in which a closing element 48 is located. The closing element 48 is structured as a valve cone and arranged to move in the axial direction, by means, not shown, for opening and closing it. The pipe part 47 is surrounded by a ring nozzle 49, which is intended for producing a gas stream. To fill the matrix 11, the extruder 46 extrudes a portion of material (not shown) of plasticized plastic.

The plastic stream which flows in toward the closing element 48 from the pipe part 47 is shaped into a ring, i.e. a ring-shaped material portion, with a round to lenticular cross-section, by the closing element 48. When the closing element 48 is closed, the portion is separated from the extruder and falls into the mold cavity of the matrix or onto a mold plate (not shown) for delivering the portion, in free fall. By means of the ring nozzle 49, a gas stream can be applied to the portion, which supports the separation of the material portion from the extruder when the closing element 48 has been moved into the closed position. This type of charging has been proven to be advantageous, since it makes it possible to avoid locally limited crystallization of the plasticized plastic after the matrix 11 has been filled and before the pressing process begins; this could otherwise result in defects of the molded head 22, the attachment between the pipe 16 and the head 22, or the attachment between the partition 15 and the head 22. Furthermore, in FIG. 4, parts which are the same as those in FIG. 2 and 3 are indicated with the same reference numbers.

Figure 5:
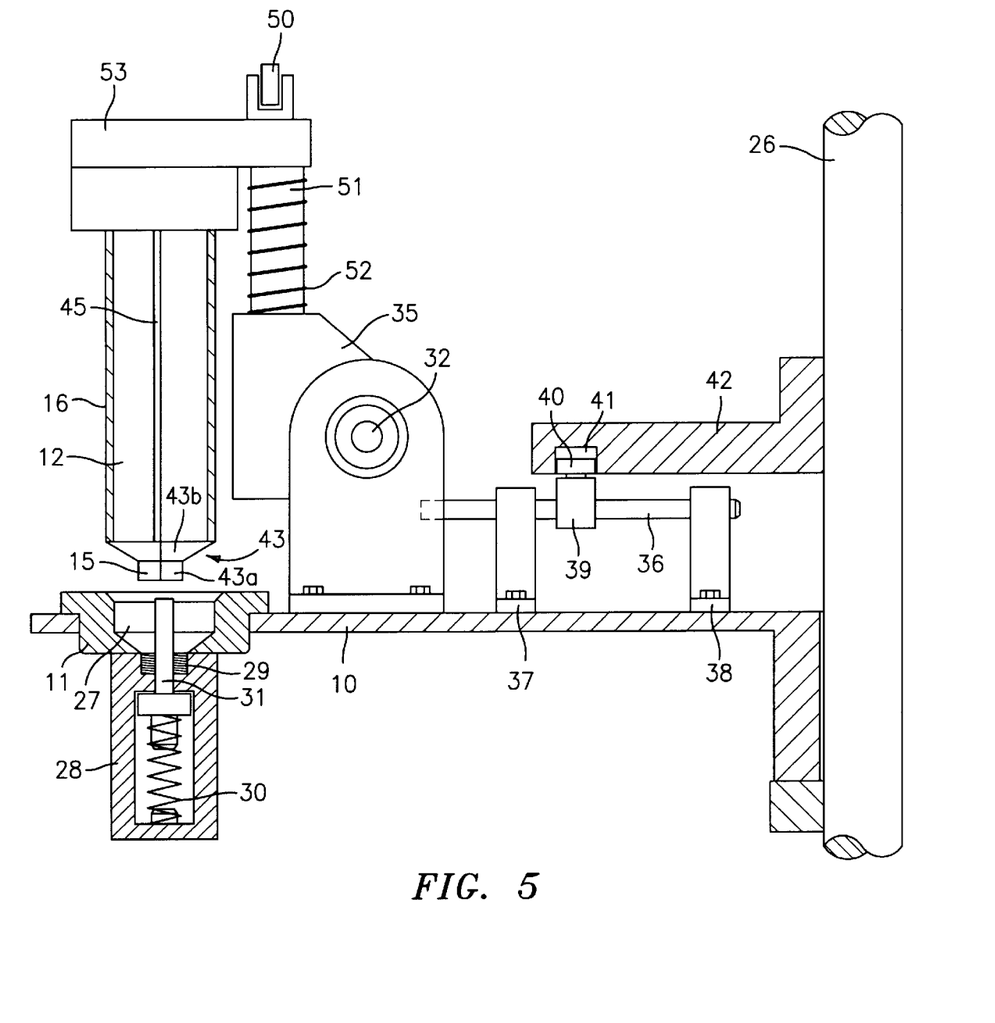
FIG. 5: the indexing table with one of the dies partly in cross-section, in step position 3, with the mandrel pivoted by 90° relative to the horizontal, into the matrix which is open toward the top and has been filled with a portion of material (not shown)

FIG. 5 shows the indexing table with one of the dies partly in cross-section, in step position 3, i.e. in station 3. The charged mandrel 12 is pivoted by 90° relative to the horizontal, and is aligned to move into the filled matrix in this position. The movement of bringing the mandrel 12 into the matrix 11 is triggered by a toggle lever 19 (see also station 3 in FIG. 1), which presses on a roll 50 of a shaft 51 which is axially guided in the pivoting part 35, and moves that shaft in the pivoting part 35, counter to the force of the spring 52, in the direction toward the matrix 11. The mandrel 11 is arranged on the shaft 51 by means of a mandrel carrier 53, so that when the shaft 51 is moved, the charged mandrel 12 moves into the matrix 11, performing the pressing process. In FIG. 5, parts which are the same as those in FIGS. 2, 3, and 4 are also indicated with the same reference numbers.

FIG. 6 shows a partition 15 in a top view. The partition 15 comprises an essentially rectangular partial piece 54, which in the case of a two-chamber tube with equal chamber dimensions essentially corresponds in its width B1 to the diameter of a tube plus that of the excess (flanges 45), and in its length Li essentially to the length of the tube pipe 16. This partial piece 54 is followed, at one end, by a second partial piece 55, which essentially corresponds to the inside shape of a tube head in its shape. For example, the continuation 43c corresponds to the dimensions of the continuation 43a, and the bevel 43d corresponds to the bevel 43b, continuation 43a and 43b being shaped surfaces of the front, free end 43 of the mandrel 12 (FIG. 3). The length L2 of the continuation 43c essentially corresponds to the length of an outlet opening, while the width B2 corresponds to its diameter. When pushed into the slit 17 of a mandrel 12, the side of the partition 15 which lies opposite the partial piece 55 rests against the slit end, while the flanges 45 of the partition 15 essentially rest against the surface of the mandrel 12, being molded against it.

By using flanges 45 widened by the aforementioned values, and applying the bonding seams close to their lengthwise edges, wider and therefore more stress-resistant bonding seams can be formed between the flange 45 and the tube pipe 16 than would be possible when flanges which are not widened are bonded over the same bond seam length. For installation into a tube, i.e. into a tube pipe 16, the flanges are preferably bent in a direction of rotation along the lengthwise edges of the partial piece 16, in such a way that when the partition 15 is pushed into the slit 17 of the mandrel 12, they rest against the outside surface of the mandrel 12, so that the tube pipe 16 can be placed onto the mandrel 12, passing over the flanges 45. While the partition 15 is being held in the mandrel 12, the flanges 45 are located between the outside surface of the mandrel 12 and the inside surface of the tube pipe 16. It is provided, for example, that bonding be performed at a cooling station for the head 22 with the second partial piece 55 melted onto it. Bonding takes place by means of inductively generated heat development and melting of the pipe and flange material in strip form, with simultaneous or subsequent pressing of the strips. For this purpose, in the case of bonding devices, the heating devices are combined with pressing devices, or the latter are followed by heating devices, and it is possible to provide cooling devices after them, for example by blowing air onto the seams. If the flanges 45 develop a certain elastic memory when they are heated, for example, i.e. if they press against the inside surface of the tube pipe 16 on their own, this can be sufficient to allow elimination of the pressing process by means of a separate tool when producing a bond seam. Because of the bending of the flanges 45 in the clockwise or counter-clockwise direction, to produce the contact against the mandrel 12, as a result of their width dimensions and the planned bond seam position (close to the lengthwise edges of the flanges), the result is that the bond seams are at an angle, on both sides, to the slit 17 for holding the partition 15, i.e. to the lengthwise axis of the mandrel 12, again in the sense of the bending direction. For the functional reliability of tubes, it has proven to be advantageous if the angles on both sides are formed to be equal, with a deviation of at most 0.5 degrees to 1.5 degrees, preferably 0.6 to 0.9 degrees.

Possible materials for the production of the tube pipes are plastic monofilms (films consisting of one layer of a plastic), plastic laminate films (films of at least two layers of plastic), or metal laminate foils (metal foil laminated with one or more plastic films on both sides). In the case of plastic laminate films and metal laminate foils, the outer layers are usually made of polyethylene, which can be bonded together well. Polyethylene is well suited for molding/attaching the head 22 on one end of the tube pipe 16, since polyethylene is equally well suited for injection molding and extrusion die molding. In the material selection for the tube pipe, its diffusion resistance must be considered in the case of more expensive packaged materials. To meet this requirement, the head can be covered with a barrier layer on the outside and/or inside. Preferably, the partition 15 consists of a plastic which can be bonded together well with the plastic of the inside surface of the tube pipe 16. For example, if the inside surface of the pipe 16 consists of polyethylene, it is advantageous of the partition also consists of a polyethylene film. If diffusion of particular components of the packaged material from one tube chamber to the other is supposed to be suppressed, the partition can also be made from a diffusion-resistant material, for example a metal laminate. Preferably, materials with a thickness of $250\mu$ to $350\mu$, preferably $290\mu$ to $310\mu$, are used for the stated purposes.

The process according to the invention, for the production of a multi-chamber tube, proceeds as follows in the device described above as an example. In station 1, the charging device 14 first charges the mandrel with a partition 15, then with a tube pipe 16. During the charging process, the partition 15 is introduced into the slit 17 of the mandrel 12, whereupon the tube pipe 16 is pushed over the mandrel 12. After the charging process has taken place, the matrix 11 of the die in station 2 is filled with a plasticized plastic, in an amount which corresponds to the amount of material required to form the tube head 22. In station 3, the pressing process for forming the head 22 is performed, by moving the mandrel 12 into the matrix 11, while at the same time a front end of the tube pipe 16 is melted onto the outer circumference of the head 22, and the partial piece 55 (i.e. the end of the partition 15 which projects into the inside of the head) is melted onto the inside of the tube head 22. With this measure, not only the shoulder area of the head, but also the outlet opening of the outlet of the head us divided by a wall. After the extrusion die molding process, cooling of the head, with the end (partial piece 55) of the partition melted onto it, takes place. The cooling time is utilized to bond the partition 15 to the inside circumference of the tube pipe 16 in the lengthwise direction, by means of the flanges 45. Fundamentally, the process according to the invention, in addition to the process steps according to the invention, aims at utilizing the cooling time 1.) for the charging process of the mandrel 12 with the partition 15, and 2.) for the process of bonding the partition 15 to the tube pipe 16, so that the total production period for a tube is not extended.

After cooling and bonding have taken place, for example in a station 5, the die is opened in a subsequent station 6, and the mandrel 12, with the tube sitting on it, is brought into a position in which a closure cap 24 can be applied to the head 22 of the tube, by means of a screw-on device 23, for example in a station 7. Afterwards, the tube is removed from the mandrel 12 in a station 8, and subsequently, the die moves back to station 1, i.e. the starting station, for the mandrel 12 to be charged.

The process according to the invention was explained as an example in connection with the device described above. Implementation of the process according to the invention is not, however, restricted to this device. Fundamentally, any device is suitable for implementing the process according to the invention, as long as it can be used to perform the claimed process steps in the claimed sequence.

What is claimed is:

1. A process for the production of a multi-chamber packaging tube made of plastic which comprises a tube pipe, a tube head connected to the tube pipe, and at least one partition housed in the tube pipe, comprising the steps of:

(a) providing a mandrel with a slit;

(b) charging the mandrel with the partition wherein the partition has a front edge and bent flanges with lengthwise edges such that the partition is introduced into the slit of the mandrel and the flanges rest against the outside surface of the mandrel;

(c) applying the tube pipe to the mandrel which has been charged with the partition;

(d) forming the tube head using a die and at the same time connecting the tube head to the tube pipe wherein the die comprises a matrix as one die half and said mandrel as another die half;

(e) melting the front edge of the partition together with the inside surface of the tube head; and (f) bonding the flanges of the partition to an inside surface of the tube pipe.

2. A process according to claim 1, including placing the tube pipe onto the mandrel such that the tube pipe is moved over the flanges of the partition into close proximity.

3. A process according to claim 1, including melting the front edge of the partition together with an inside surface of a shoulder on the tube head.

4. A process according to claim 1, including bonding each flange near the lengthwise edge by means of a strip-shaped lengthwise seam.

5. A process according to claim 4, including forming the lengthwise seam by melting and pressing together a strip along the tube pipe and, opposite to it, a strip along the flange.

6. A process according to claim 5, wherein the step of melting the front edge of the partition together with the inside surface of the tube head is performed inductively.

7. A process according to claim 5, including pressing using elastic memory of the flange.

8. A process according to claim 5, including pressing by means of a pressing tool.

9. A process according to claim 5, including cooling the lengthwise seam after pressing.

10. A process according to claim 1, wherein the tube head is shaped and connected to the tube pipe by extrusion die molding.

11. A process according to claim 1, wherein the tube head is shaped and connected to the tube pipe by injection molding.

12. A process according to claim 1, wherein the bent flanges are formed by bending flanges of the partition in a clockwise or counter-clockwise direction.

* * * * *